(12) United States Patent
Park

(10) Patent No.: US 11,039,456 B1
(45) Date of Patent: Jun. 15, 2021

(54) CONTROL CHANNEL RESOURCE ALLOCATION

(71) Applicant: Sprint Spectrum LP, Overland Park, KS (US)

(72) Inventor: Justin Sungki Park, Ashburn, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 48 days.

(21) Appl. No.: 16/152,976

(22) Filed: Oct. 5, 2018

(51) Int. Cl.
*H04W 72/04* (2009.01)
*H04W 72/12* (2009.01)
*H04W 52/36* (2009.01)

(52) U.S. Cl.
CPC ..... *H04W 72/121* (2013.01); *H04W 72/1252* (2013.01); *H04W 52/365* (2013.01)

(58) Field of Classification Search
CPC .................. H04W 72/121; H04W 72/1252
See application file for complete search history.

(56) References Cited

U.S. PATENT DOCUMENTS

| | | | | |
|---|---|---|---|---|
| 8,190,168 B2 * | 5/2012 | Wong | .................. | H04W 72/121 455/452.1 |
| 8,229,446 B2 * | 7/2012 | Shin | ...................... | H04W 48/12 455/450 |
| 8,559,360 B2 * | 10/2013 | Kim | .................... | H04W 52/243 370/318 |
| 8,774,848 B2 * | 7/2014 | Chang | .................. | H04W 72/042 455/509 |
| 8,792,434 B2 | 7/2014 | Hedlund et al. | | |
| 8,964,777 B2 * | 2/2015 | Yamamoto | ............ | H04L 1/0026 370/458 |
| 8,989,752 B2 * | 3/2015 | Zhao | ...................... | H04W 16/10 455/448 |
| 9,814,028 B2 * | 11/2017 | Kim | ...................... | H04L 5/0016 |
| 9,949,213 B2 * | 4/2018 | Johansson | ........... | H04W 52/325 |
| 10,021,693 B1 * | 7/2018 | Pawar | ............... | H04W 52/0206 |
| 10,034,292 B1 * | 7/2018 | Liu | ..................... | H04W 72/0446 |
| 2010/0290418 A1 * | 11/2010 | Nishio | ................ | H04J 13/0077 370/329 |
| 2012/0243431 A1 * | 9/2012 | Chen | ................. | H04W 72/0406 370/252 |
| 2012/0252470 A1 * | 10/2012 | Wong | .................. | H04W 72/048 455/450 |
| 2013/0142100 A1 * | 6/2013 | Vrzic | ................... | H04J 11/0053 370/312 |
| 2013/0148616 A1 * | 6/2013 | Takano | ............... | H04W 72/042 370/329 |
| 2013/0196678 A1 * | 8/2013 | Liu | ........................ | H04W 72/04 455/452.1 |
| 2014/0233541 A1 * | 8/2014 | Kim | ...................... | H04L 5/0037 370/336 |
| 2018/0124657 A1 * | 5/2018 | Hedlund | ........... | H04W 36/0055 |
| 2019/0075589 A1 * | 3/2019 | Jeon | .................. | H04W 72/1278 |

* cited by examiner

*Primary Examiner* — Rasheed Gidado

(57) ABSTRACT

Methods, systems, and processing nodes for allocating resources to a control channel based on a number of wireless devices determined to be near a cell edge of an access node. An exemplary method for allocating resources to a control channel includes determining a number of wireless devices that are located near an edge of a coverage area of an access node, and adjusting an amount of resources scheduled in the control channel based on the determined number of wireless devices.

10 Claims, 4 Drawing Sheets

US 11,039,456 B1

CONTROL CHANNEL RESOURCE ALLOCATION

TECHNICAL BACKGROUND

As wireless networks evolve and grow, there are ongoing challenges in communicating data across different types of networks. For example, a wireless network may include one or more access nodes, such as base stations, for providing wireless voice and data service to wireless devices in various coverage areas of the one or more access nodes. While wireless devices that are close to an access node are able to communicate with the access node using standard power levels, wireless devices further away from an access node and closer to an edge of a coverage area must utilize increased amounts of power for communication. With the advent of multi-antenna technologies such as massive multiple-input-multiple-output (MIMO) and beamforming, transmitting data to such cell-edge wireless devices is easier. However, wireless networks utilize both control channels and data channels, and control channels are not set up to utilize the advanced multi-antenna techniques. Thus, existing methods increase an amount of resources or a power level of resources in the control channel. However, indiscriminately increasing these control channel resources to reach cell-edge wireless devices causes additional problems, such as wasting resources, or inter-cell (ICI) interference due to the increased power levels.

OVERVIEW

Exemplary embodiments described herein include methods, systems, and processing nodes for allocating resources to a control channel based on a number of wireless devices determined to be near a cell edge of an access node. An exemplary method for allocating resources to a control channel includes determining a number of wireless devices that are located near an edge of a coverage area of an access node, and adjusting an amount of resources scheduled in the control channel based on the determined number of wireless devices.

An exemplary system for allocating resources in a control channel includes a processing node, and a processor coupled to the processing node. The processor is configured to perform operations including determining a number of wireless devices that are located near an edge of a coverage area of an access node, and adjusting one or more of an amount of resources and a power allocation of resources in the control channel based on the determined number of wireless devices.

An exemplary processing node for allocating resources in a control channel is configured to perform operations including determining an increase in a number of wireless devices that are located near an edge of a coverage area of an access node, and increasing an amount of resources allocated towards control information in the control channel.

DETAILED DESCRIPTION

Figure 1:
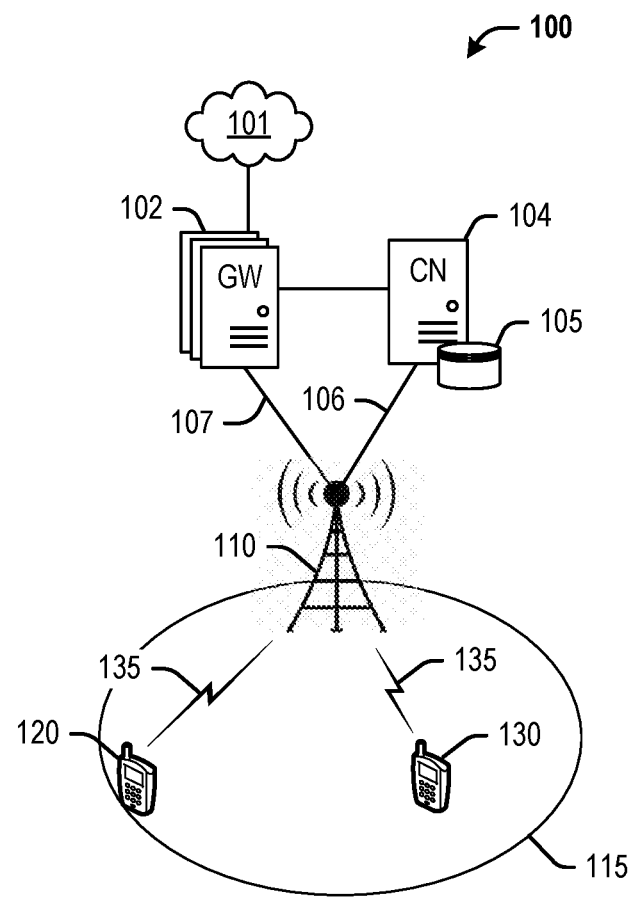
FIG. 1 depicts an exemplary system for allocating resources in a control channel.

In embodiments disclosed herein, a method for scheduling resources in a control channel of a radio frame, the method includes determining a number of wireless devices that are located near an edge of a coverage area of an access node, and adjusting an amount of resources scheduled in the control channel based on the determined number of wireless devices. The resources are utilized to broadcast control information within the control channel to a plurality of wireless devices attached to the access node. The resources described herein may include physical resource blocks (PRBs) within a subframe. As further described herein, the subframe can comprise a dedicated portion of PRBs allocated for control information, i.e. a control channel, and another dedicated portion of PRBs allocated for data transmission, i.e. a data channel. In embodiments implemented within long-term evolution (LTE) or LTE-Advanced (LTE-A) networks, the control channel may be referred to as PDCCH, the data channel may be referred to as PDSCH. The PDCCH carries control information about the data being transmitted on the current subframe, and information about which resources a wireless device may use for transmitting uplink data back to the access node. For example, a PDCCH may be used to transmit a message containing "downlink control information" (DCI), which includes resource assignments for a wireless device or group of wireless devices. The DCI, along with other control information, may be transmitted within a group of resources of the control channel referred to herein as a "control channel element" (CCE). In an exemplary embodiment, a CCE comprises a defined plurality of resource elements. For example, a CCE may consist of 6 resource element groups (REGs), and a control resource set (CORESET) occupies a set of resource blocks in the frequency domain and several symbols in the time domain, such that the PDCCH is transmitted in the CORESET, and the remaining resources in the CORESET can be allocated to data transmission. As described herein, the CCE aggregation levels and number of candidates (i.e. wireless devices) per aggregation level can be flexibly configured. Further, CCEs containing information specific to a wireless device may be considered as being "associated with" a specific wireless device. Thus, wireless devices may be instructed to scan specific regions of the PDCCH for the CCEs associated with said wireless devices.

Determining the number of wireless devices may include receiving one or more power headroom reports from said plurality of wireless devices attached to the access node, and identifying the wireless devices that are located near the edge of the coverage area of the access node based on the one or more power headroom reports. In an exemplary embodiment, the power headroom report is transmitted from a wireless device on an uplink channel, such as the physical uplink shared channel (PUSCH). The power headroom level reported by each wireless device is a measure of how much power remains available to the device for uplink transmission. For example, a power utilized by the wireless device may be subtracted from a maximum power available to the wireless device to obtain the power headroom. The power headroom level may be used to determine whether or not a wireless device is at a cell edge. In particular, a wireless device that is close to the access node does not require as much power for uplink transmission and, therefore, such a wireless device reports a relatively high power headroom level. In contrast, a wireless device that is far from the access node requires more power for uplink transmission and, therefore, such a wireless device reports a relatively low power headroom level, given that it is using close to the maximum power. In particular, wireless devices at or near a cell edge (i.e. an edge of a coverage area of the access node) may be utilizing the maximum available power and, therefore, report a power headroom level of zero (or sometimes less than zero). Thus, power headroom levels in the power headroom reports received from each wireless device are compared with a threshold, and wireless devices having a power headroom level below the threshold are identified as the wireless devices that are located near the edge of the coverage area. Further, a historical trend of the received one or more power headroom reports may be used to identify the cell-edge wireless devices.

Upon determining a number or quantity of cell-edge wireless devices, the method includes adjusting the amount of resources scheduled in the control channel. For example, an aggregation level of one or more control channel elements (CCEs) in the control channel may be increased based on an increase in a number of cell-edge wireless devices. The aggregation level is defined as a number of CCEs used for transmitting control information, and has values of 1, 2, 4, 8, or 16. Higher aggregation levels (i.e. greater number of CCEs) are used when channel conditions are poor (such as, for instance, for cell-edge wireless devices), so as to provide more redundant information to these wireless devices, enabling the wireless devices to decode the control information in the control channel. Increasing the aggregation level of the one or more CCEs can include doubling an aggregation level of the one or more CCEs. Further, a power level (or a power boost) of the one or more CCEs may be performed in addition to increasing the aggregation level. For example, the resource blocks within one or more CCEs are assigned a higher transmit power level by a scheduler of an access node. In an exemplary embodiment, the boost is +3 dB. As described herein, specific ranges of CCEs may be associated with certain wireless devices by, for example, instructing said certain wireless devices to search for control information within the specific ranges of CCEs of the control channel. Further, other CCEs without the increased aggregation level are assigned to other wireless devices not near the cell edge. The CCEs with the power boost may be the same CCEs with the higher aggregation level, or may be different CCEs. In an exemplary embodiment, increasing the aggregation level may also use more PDCCH resources. Therefore, only the CCEs at the highest aggregation level (e.g. aggregation level 8) may be boosted. Consequently, the signal level is increased for CCEs received by cell-edge wireless devices. In another example, power-boosting one or more CCEs may reduce the total number of CCEs required for a wireless device, hence freeing up CCEs for additional cell-edge wireless devices.

Thus, the described method avoids indiscriminately using excessive resources for control channels, while minimizing interference caused by excessive and indiscriminate power boosting. These operations may be performed repeatedly for specific time intervals, such as a transmission time interval, or a specified number of subframes. Further, these operations may be incorporated within a system or processing node in a wireless network. For example, in another exemplary embodiment, a system for scheduling resources in a control channel of a radio frame includes a processing node, and a processor coupled to the processing node. The processor is configured to perform operations including determining a number of wireless devices that are located near an edge of a coverage area of an access node, and adjusting one or more of an amount of resources and a power allocation of resources in the control channel based on the determined number of wireless devices. The resources may be utilized to broadcast control information within the control channel. Determining the number of wireless devices further comprises receiving one or more power headroom reports from a plurality of wireless devices attached to the access node, and identifying the wireless devices that are located near the edge of the coverage area of the access node based on the one or more power headroom reports. The system is further configured to compare a power headroom level in each received power headroom report to a threshold, and identify wireless devices having a power headroom level below the threshold. The wireless devices having the power headroom level below the threshold are identified as the wireless devices that are located near the edge of the coverage area. Further, adjusting the amount of resources scheduled in the control channel comprises increasing an aggregation level of one or more control channel elements (CCEs) in the control channel based on the determined number of wireless devices. The one or more CCEs with the increased aggregation level are assigned to the wireless devices near the edge. Further, adjusting the power allocation of resources in the control channel comprises increasing the power allocation of the one or more CCEs. In another exemplary embodiment, a processing node for scheduling resources in a control channel of a radio frame is configured to perform operations including determining an increase in a number of wireless devices that are located near an edge of a coverage area of an access node, and increasing an amount of resources allocated towards control information in the control channel. The control information with the increased amount of resources is assigned to the wireless devices located near the edge. The operations further include determining a decrease in the number of wireless devices that are located near the edge, and decreasing the amount of resources allocated towards control information in the control channel. These and additional operations are further described with respect to the embodiments depicted in FIGS. 1-4 below.

FIG. 1 depicts an exemplary system 100 for allocating resources in a control channel. System 100 comprises a communication network 101, gateway 102, controller node 104, access node 110, and wireless devices 120, 130. Access node 110 is illustrated as having a coverage area 115, with wireless devices 120, 130 being located within coverage area 115 and accessing network services from access node 110. Access node 110 can be any network node configured to provide communication between end-user wireless devices 120, 130 and communication network 101, including standard access nodes and/or short range, low power, small access nodes. For instance, access node 110 may include any standard access node, such as a macrocell access node, base transceiver station, a radio base station, next generation or gigabit NodeBs (gNBs) in 5G networks, or enhanced eNodeBs (eNBs) in 4G/LTE networks, or the like. In an exemplary embodiment, a macrocell access node can have a coverage area 115 in the range of approximately five kilometers to thirty five kilometers and an output power in the tens of watts. In other embodiments, access node 110 can be a small access node including a microcell access node, a picocell access node, a femtocell access node, or the like such as a home NodeB or a home eNodeB device. In either case, by virtue of comprising a plurality of antennae as further described herein, access node 110 can deploy or implement one or more communication links 125, 135, enabling wireless devices 120, 130 to receive data from access node 110 (in a downlink direction) and transmit data to access node 110 (in an uplink direction). Moreover, it is noted that while access node 110 is illustrated in FIG. 1, any number of access nodes can be implemented within system 100.

As illustrated herein, wireless device 120 is near a cell edge of coverage area 115, while wireless device 130 is geographically located closer to access node 110. Consequently, communication link 135 may require additional air-interface resources (or CCEs in terms of control channel resources) to enable reliable communication between cell-edge wireless device 120 and access node 110. As described above in the background section, conventional methods involve indiscriminately increasing an aggregation level and/or power boost of CCEs, which becomes problematic particularly in the case of beamforming or massive MIMO transmissions. Thus, access node 110 (or a processing node communicatively coupled thereto) may be configured to perform operations including determining a number of wireless devices that are located near an edge of coverage area 115, and adjusting an amount of resources scheduled in the control channel based on the determined number of wireless devices. The increased resources (in terms of quantity/aggregation level as well as power level) enable broadcasting of control information within the control channel to cell-edge wireless devices such as wireless device 120, while conserving resources for control information transmitted to non cell-edge wireless devices such as wireless device 130. Further, the increased resources in the control channel facilitate broadcasting of control information to wireless devices being served by beamforming and/or MIMO transmissions, versus the current state of the art where control channel information is not transmitted using these methods.

Determining the number of cell-edge wireless devices may include receiving one or more power headroom reports from each wireless device attached to access node 110 (e.g. both wireless devices 120 and 130), and identifying the cell-edge wireless devices (e.g. wireless device 120) based on the one or more power headroom reports. In an exemplary embodiment, the power headroom report is transmitted from each wireless device 120, 130 on an uplink channel 125, 135 respectively. The uplink channel can include a PUSCH. The power headroom level reported by each wireless device 120, 130 is a measure of how much power remains available to the wireless device for uplink transmission. For example, a power utilized by each wireless device 120, 130 may be subtracted from a maximum power available to the wireless device to obtain the power headroom. The power headroom level may be used to determine whether or not a wireless device is at a cell edge. In particular, wireless device 130 that is close to the access node 110 does not require as much power for uplink transmission and, therefore, such wireless device 130 may report a relatively high power headroom level. In contrast, wireless device 120 that is far from the access node 110 requires more power for uplink transmission and, therefore, wireless device 120 reports a relatively low power headroom level, given that it is using close to the maximum power. For example, wireless device 120 may be utilizing the maximum available power and, therefore, report a power headroom level of zero. Thus, power headroom levels in the power headroom reports received from each wireless device 120, 130 are compared with a threshold, and wireless device 120 having a power headroom level below the threshold is identified as a cell-edge wireless device.

Upon determining a number or quantity of cell-edge wireless devices (such as wireless device 120), the method includes adjusting the amount of resources scheduled in the control channel. For example, an aggregation level of one or more CCEs in the control channel may be increased based on an increase in a number of cell-edge wireless devices. Similarly, the aggregation level of the one or more CCEs may be decreased based on a decrease in a number of cell-edge wireless devices. The aggregation level may be defined as a number of CCEs used for transmitting control information, and may comprise values of 1, 2, 4, 8, or 16. Higher aggregation levels (i.e. greater number of CCEs) are used when channel conditions are poor for cell-edge wireless devices such as wireless device 120, so as to provide more redundant information to these wireless devices, enabling wireless device 120 to decode the control information in the control channel of communication link 135. Increasing the aggregation level of the one or more CCEs can include doubling an aggregation level of the one or more CCEs. Further, a power level (or a power boost) of the one or more CCEs may be performed in addition to increasing the aggregation level. For example, the resource blocks within one or more CCEs are assigned a higher transmit power level by a scheduler of access node 110. In an exemplary embodiment, the boost is +3 dB. As described herein, specific ranges of CCEs may be associated with each of wireless device 120, 130 by, for example, instructing wireless devices 120, 130 to search for control information within the specific ranges of CCEs of the control channel. Further, other CCEs without the increased aggregation level are assigned to other wireless devices not near the cell edge. The CCEs with the power boost may be the same CCEs with the higher aggregation level, or may be different CCEs. In an exemplary embodiment, increasing the aggregation level may also use more PDCCH resources. Therefore, only the CCEs at the highest aggregation level (e.g. aggregation level 8) may be boosted. Consequently, the signal level is increased for CCEs received by cell-edge wireless device 120. In another example, power-boosting one or more CCEs may reduce the total number of CCEs required for a wireless device, hence freeing up CCEs for additional cell-edge wireless devices.

Access node 110 can comprise a processor and associated circuitry to execute or direct the execution of computer-readable instructions to perform operations such as those further described herein. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicates with gateway node 102 and controller node 104 via communication links 106, 107. Access nodes 110 may communicate with other access nodes (not shown) using a direct link such as an X2 link or similar.

Wireless devices 120, 130 may be any device, system, combination of devices, or other such communication platform capable of communicating wirelessly with access node 110 using one or more frequency bands deployed therefrom. Wireless devices 120, 130 may be, for example, a mobile phone, a wireless phone, a wireless modem, a personal digital assistant (PDA), a voice over internet protocol (VoIP)

phone, a voice over packet (VOP) phone, or a soft phone, as well as other types of devices or systems that can exchange audio or data via access node 110. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 120, 130, etc. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), 5G NR, or combinations thereof. Communications links 106, 107 may include S1 communications links. Other wireless protocols can also be used. Communication links 106, 107 can be a direct link or might include various equipment, intermediate components, systems, and networks. Communication links 106, 107 may comprise many different signals sharing the same link Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) or 5G NR, and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR, and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to access node 110 and wireless devices 120, 130, such as control information, device location, historical trends of power headroom levels, etc. This information may be requested by or shared with access node 110 via connections 106, 107, X2 connections, and so on. The software comprises computer programs, firmware, or some other form of machine-readable instructions, and may include an operating system, utilities, drivers, network interfaces, applications, or some other type of software, and combinations thereof. Controller node 107 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

The methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: access node 110, controller node 104, and/or network 101.

Figure 2:
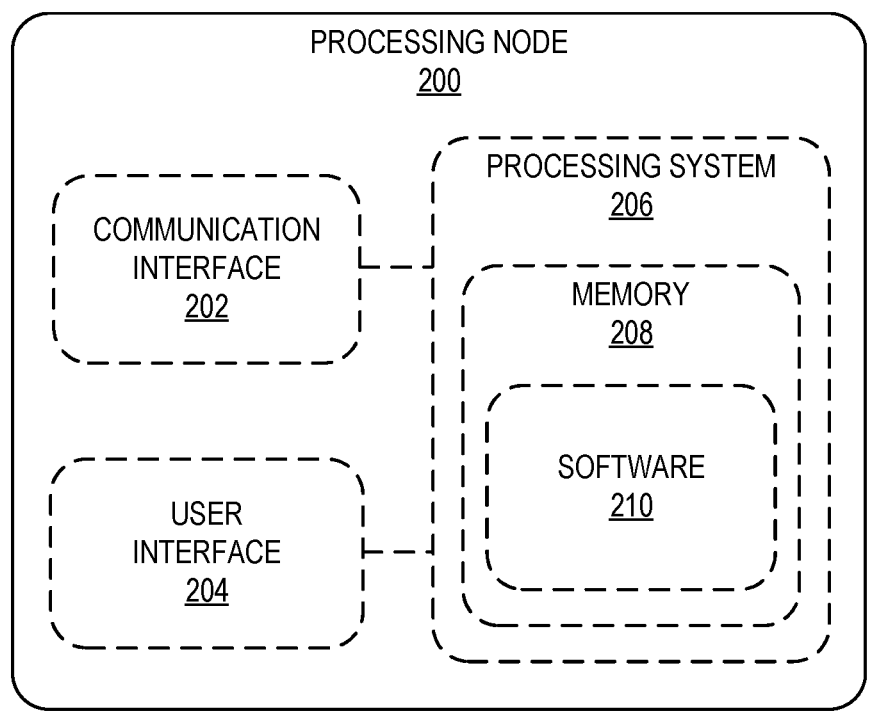
FIG. 2 depicts an exemplary processing node for allocating resources in a control channel.

FIG. 2 depicts an exemplary processing node 200 for allocating resources in a control channel. Processing node comprises a communication interface 202, user interface 204, and processing system 206 in communication with communication interface 202 and user interface 204. Processing system 206 includes storage 208, which can comprise a disk drive, flash drive, memory circuitry, or other memory device. Storage 208 can store software 210 which is used in the operation of the processing node 200. Storage 208 may include a disk drive, flash drive, data storage circuitry, or some other memory apparatus. For example, storage 208 may include a buffer. Software 210 may include computer programs, firmware, or some other form of machine-readable instructions, including an operating system, utilities, drivers, network interfaces, applications, or some other type of software. For example, software 210 may include a coherence determination module. Processing system 206 may include a microprocessor and other circuitry to retrieve and execute software 210 from storage 208. Processing node 200 may further include other components such as a power management unit, a control interface unit, etc., which are omitted for clarity. Communication interface 202 permits processing node 200 to communicate with other network elements. User interface 204 permits the configuration and control of the operation of processing node 200.

Processing node 200 may be configured to perform operations including scheduling resources in a control channel of a radio frame by determining an increase in a number of wireless devices that are located near an edge of a coverage area of an access node, and increasing an amount of resources allocated towards control information in the control channel. The control information with the increased amount of resources is assigned to the wireless devices located near the edge. The operations further include determining a decrease in the number of wireless devices that are located near the edge, and decreasing the amount of resources allocated towards control information in the control channel. Processing node 200 may be further configured to perform other operations described herein, without limitation, and in any order.

Figure 3:
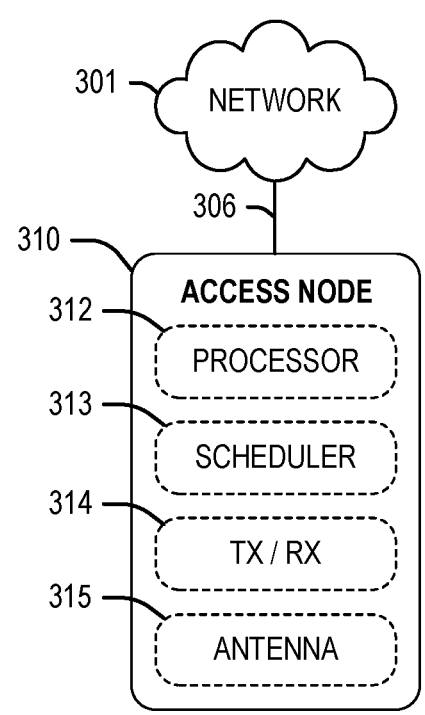
FIG. 3 depicts an exemplary access node for allocating resources in a control channel.

FIG. 3 depicts an exemplary access node 310 for allocating resources in a control channel. Access node 310 is configured as an access point for providing network services from network 301 to end-user wireless devices via a radio-air interface deployed therefrom. Access node 310 is illustrated as comprising a processor 312, a scheduler 313 for storing the scheduling operations recited herein (that are performed by processor 312), and a transceiver 314 for transmitting and receiving signals via antennae 315. Although only one transceiver and antenna are depicted in access node 310, additional transceivers and antennae may be incorporated in order to deploy formed beams or MU-MIMO data streams, and/or to facilitate communication with other network nodes on network 201. Further, access node 210 is communicatively coupled to network 201 via communication interface 206, which may be any wired or wireless link as described above.

In operation, scheduler 313 comprises one or more logical modules that are executed by processor 312 to perform operations described herein. For example, scheduler 313 may allocate physical resource blocks (PRBs) within a subframe comprising a first dedicated portion of PRBs allocated for control information, i.e. a control channel, and a second dedicated portion of PRBs allocated for data transmission, i.e. a data channel. In embodiments implemented within long-term evolution (LTE) or LTE-Advanced (LTE-A) networks, the control channel may be referred to as PDCCH, the data channel may be referred to as PDSCH. The PDCCH carries control information about the data being transmitted on the current subframe, and information about which resources a wireless device may use for transmitting uplink data back to the access node 310. For example, a PDCCH may be used to transmit a message containing "downlink control information" (DCI), which includes resource assignments for a wireless device or group of wireless devices. The DCI, along with other control information, may be transmitted within a group of resources of the control channel referred to herein as a "control channel element" (CCE). In an exemplary embodiment, a CCE comprises a defined plurality of resource elements. Further, CCEs containing information specific to a wireless device may be considered as being "associated with" a specific wireless device. Thus, wireless devices may be instructed to scan specific regions of the PDCCH for the CCEs associated with said wireless devices.

Determining the number of wireless devices may include receiving one or more power headroom reports from said plurality of wireless devices attached to the access node 310, and identifying the wireless devices that are located near the edge of the coverage area of the access node 310 based on the one or more power headroom reports. In an exemplary embodiment, the power headroom report is transmitted from a wireless device on an uplink channel, such as the physical uplink shared channel (PUSCH). The power headroom level reported by each wireless device is a measure of how much power remains available to the device for uplink transmission. For example, a power utilized by the wireless device may be subtracted from a maximum power available to the wireless device to obtain the power headroom. The power headroom level may be used to determine whether or not a wireless device is at a cell edge. In particular, a wireless device that is close to the access node 310 does not require as much power for uplink transmission and, therefore, such a wireless device reports a relatively high power headroom level. In contrast, a wireless device that is far from the access node 310 requires more power for uplink transmission and, therefore, such a wireless device reports a relatively low power headroom level, given that it is using close to the maximum power. In particular, wireless devices at or near a cell edge (i.e. an edge of a coverage area of the access node 310) may be utilizing the maximum available power and, therefore, report a power headroom level of zero (or sometimes less than zero). Thus, power headroom levels in the power headroom reports received from each wireless device are compared with a threshold, and wireless devices having a power headroom level below the threshold are identified as the wireless devices that are located near the edge of the coverage area. Further, a historical trend of the received one or more power headroom reports may be used to identify the cell-edge wireless devices.

Upon determining a number or quantity of cell-edge wireless devices, the operations include adjusting the amount of resources scheduled in the control channel. For example, an aggregation level of one or more control channel elements (CCEs) in the control channel may be increased based on an increase in a number of cell-edge wireless devices. The aggregation level is defined as a number of CCEs used for transmitting control information, and has values of 1, 2, 4, 8, or 16. Higher aggregation levels (i.e. greater number of CCEs) are used when channel conditions are poor (such as, for instance, for cell-edge wireless devices), so as to provide more redundant information to these wireless devices, enabling the wireless devices to decode the control information in the control channel. Increasing the aggregation level of the one or more CCEs can include doubling an aggregation level of the one or more CCEs. Further, a power level (or a power boost) of the one or more CCEs may be performed in addition to increasing the aggregation level. For example, the resource blocks within one or more CCEs are assigned a higher transmit power level by scheduler 313. In an exemplary embodiment, the boost is +3 dB. As described herein, specific ranges of CCEs may be associated with certain wireless devices by, for example, instructing said certain wireless devices to search for control information within the specific ranges of CCEs of the control channel. Further, other CCEs without the increased aggregation level are assigned to other wireless devices not near the cell edge. The CCEs with the power boost may be the same CCEs with the higher aggregation level, or may be different CCEs. In an exemplary embodiment, increasing the aggregation level may also use more PDCCH resources. Therefore, only the CCEs at the highest aggregation level (e.g. aggregation level 8) may be boosted. Consequently, the signal level is increased for CCEs received by cell-edge wireless devices. In another example, power-boosting one or more CCEs may reduce the total number of CCEs required for a wireless device, hence freeing up CCEs for additional cell-edge wireless devices. Thus, the described method avoids indiscriminately using excessive resources for control channels, while minimizing interference caused by excessive and indiscriminate power boosting. Moreover, these operations may be performed at defined time intervals such as every transmission-time-interval (TTI), every 10 ms, every 1 s, etc., thereby providing sufficient time for changes to be realized in the network.

Figure 4:
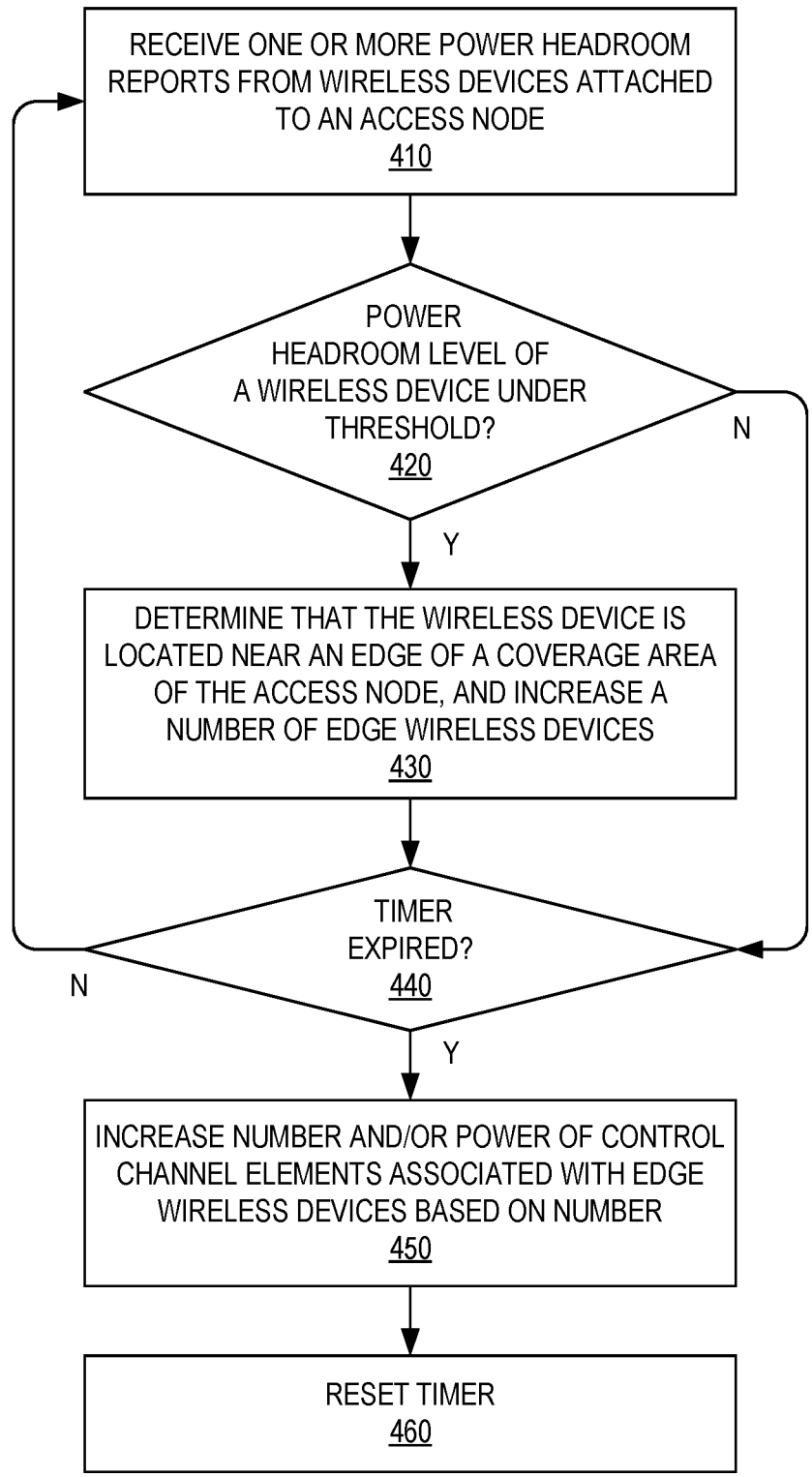
FIG. 4 depicts an exemplary method for allocating resources in a control channel.

FIG. 4 depicts an exemplary method for allocating resources in a control channel. The method of FIG. 4 is illustrated with respect to an access node. In other embodiments, the method can be implemented with any suitable network element. Although FIG. 4 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 410, one or more power headroom reports are received from wireless devices attached to an access node. In an exemplary embodiment, the power headroom report is transmitted from a wireless device on an uplink channel, such as the physical uplink shared channel (PUSCH). The power headroom level reported by each wireless device is a measure of how much power remains available to the device for uplink transmission. For example, a power utilized by the wireless device may be subtracted from a maximum power available to the wireless device to obtain the power headroom. The power headroom level for each wireless device enables a determination (at 420-430) of a number of cell-edge wireless devices. In particular, a wireless device that is close to the access node does not require as much power for uplink transmission and, therefore, such a wireless device reports a relatively high power headroom level. In contrast, a wireless device that is far from the access node requires more power for uplink transmission and, therefore, such a wireless device reports a relatively low power headroom level, given that it is using close to the maximum power. In particular, wireless devices at or near a cell edge (i.e. an edge of a coverage area of the access node) may be utilizing the maximum available power and, therefore, report a power headroom level of zero (or sometimes less than zero). Thus, at 420, power headroom levels in the power headroom reports received from each wireless device are compared with a threshold and, at 430, wireless devices having a power headroom level below the threshold are identified as the wireless devices that are located near the edge of the coverage area, and a counter is incremented.

This process is repeated until, at 440, a timer is expired. Upon expiration of the timer, at 450, the amount of resources scheduled in the control channel is adjusted based on the number or quantity of edgy wireless devices determined at 420. For example, an aggregation level of one or more control channel elements (CCEs) in the control channel may be increased based on an increase in a number of cell-edge wireless devices. The aggregation level is defined as a number of CCEs used for transmitting control information, and has values of 1, 2, 4, 8, or 16. Higher aggregation levels (i.e. greater number of CCEs) are used when channel conditions are poor (such as, for instance, for cell-edge wireless devices), so as to provide more redundant information to these wireless devices, enabling the wireless devices to decode the control information in the control channel. Increasing the aggregation level of the one or more CCEs can include doubling an aggregation level of the one or more CCEs. Further, a power level (or a power boost) of the one or more CCEs may be performed in addition to increasing the aggregation level. For example, the resource blocks within one or more CCEs are assigned a higher transmit power level by a scheduler of an access node. In an exemplary embodiment, the boost is +3 dB. As described herein, specific ranges of CCEs may be associated with certain wireless devices by, for example, instructing said certain wireless devices to search for control information within the specific ranges of CCEs of the control channel. Further, other CCEs without the increased aggregation level are assigned to other wireless devices not near the cell edge. The CCEs with the power boost may be the same CCEs with the higher aggregation level, or may be different CCEs. In an exemplary embodiment, increasing the aggregation level may also use more PDCCH resources. Therefore, only the CCEs at the highest aggregation level (e.g. aggregation level 8) may be boosted. Consequently, the signal level is increased for CCEs received by cell-edge wireless devices. In another example, power-boosting one or more CCEs may reduce the total number of CCEs required for a wireless device, hence freeing up CCEs for additional cell-edge wireless devices. Finally, at 460, the timer is reset and the method is repeated.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for scheduling resources in a control channel of a radio frame, the method comprising:
    determining an increase in a number of wireless devices that are located near an edge of a coverage area of an access node, wherein determining the increase in the number of wireless devices further comprises receiving one or more power headroom reports from said plurality of wireless devices attached to the access node, and identifying the wireless devices that are located near the edge of the coverage area of the access node based on the one or more power headroom reports;
    based on the increase in the number of wireless devices, increasing an aggregation level of one or more control channel elements (CCEs) assigned to the wireless devices;
    increasing a power level of the one or more CCEs with the increased aggregation level; and
    repeating the determining and increasing operations every expiration of a time interval,
    wherein the time interval is based on a transmission time interval of the radio frame, and
    wherein the CCEs are utilized to broadcast control information within the control channel to a plurality of wireless devices attached to the access node.

2. The method of claim 1, further comprising:
    comparing a power headroom level in each received power headroom report to a threshold; and
    identifying wireless devices having a power headroom level below the threshold,
    wherein the wireless devices having the power headroom level below the threshold comprise the wireless devices that are located near the edge of the coverage area.

3. The method of claim 2, wherein the threshold comprises 0 dB.

4. The method of claim 1, wherein identifying the wireless devices that are located near the edge of the coverage area further comprises determining a historical trend of the received one or more power headroom reports.

5. The method of claim 1, wherein increasing the aggregation level of the one or more CCEs comprises doubling the aggregation level of the one or more CCEs.

6. The method of claim 1, further comprising assigning other CCEs without the increased aggregation level to other wireless devices not near the cell edge.

7. A system for scheduling resources in a control channel of a radio frame, the system comprising:
    a processing node; and
    a processor coupled to the processing node, the processor configured to perform operations comprising:
    determining an increase in a number of wireless devices that are located near an edge of a coverage area of an access node, wherein determining the increase in the number of wireless devices further comprises receiving one or more power headroom reports from a plurality of wireless devices attached to the access node, and
    identifying the wireless devices that are located near the edge of the coverage area of the access node based on the one or more power headroom reports;
    based on the increase in the number of wireless devices, increasing an aggregation level of one or more control channel elements (CCEs) assigned to the wireless devices;
    increasing a power level of the one or more CCEs with the increased aggregation level; and
    repeating the determining, identifying, and increasing operations every expiration of a time interval,
    wherein the time interval is based on a transmission time interval of a radio frame, and
    wherein the CCEs are utilized to broadcast control information within the control channel.

8. The system of claim 7, further comprising:
    comparing a power headroom level in each received power headroom report to a threshold; and
    identifying wireless devices having a power headroom level below the threshold,
    wherein the wireless devices having the power headroom level below the threshold comprise the wireless devices that are located near the edge of the coverage area.

9. A processing node for scheduling resources in a control channel of a radio frame, the processing node being configured to perform operations comprising:
    determining an increase in a number of wireless devices that are located near an edge of a coverage area of an access node, wherein determining the increase in the number of wireless devices further comprises receiving one or more power headroom reports from said plurality of wireless devices attached to the access node, and identifying the wireless devices that are located near the edge of the coverage area of the access node based on the one or more power headroom reports;
    increasing an aggregation level of one or more control channel elements (CCEs) assigned to the wireless devices;
    increasing a power level of the one or more CCEs with the increased aggregation level; and
    repeating the determining and increasing operations every expiration of a time interval,
    wherein the time interval is based on a transmission time interval of a radio frame, and
    wherein the control information with the increased amount of resources is assigned to the wireless devices located near the edge.

10. The processing node of claim 9, wherein the operations further comprise:
    determining a decrease in the number of wireless devices that are located near the edge; and
    decreasing one or more of the aggregation level or the power level of the one or more CCEs.

* * * * *